United States Patent
Grover

(10) Patent No.: US 10,097,473 B2
(45) Date of Patent: Oct. 9, 2018

(54) MOBILE DEVICE TO VEHICLE OUTPUT STREAM PACKET PRIORITIZATION

(71) Applicant: MYINE ELECTRONICS, INC., Royal Oak, MI (US)

(72) Inventor: Joey Ray Grover, Madison Heights, MI (US)

(73) Assignee: Livio, Inc., Royal Oak, MI (US)

( * ) Notice: Subject to any disclaimer, the term of this patent is extended or adjusted under 35 U.S.C. 154(b) by 119 days.

(21) Appl. No.: 15/377,341

(22) Filed: Dec. 13, 2016

(65) Prior Publication Data

US 2018/0167330 A1 Jun. 14, 2018

(51) Int. Cl.
| | |
|---|---|
| H04L 12/26 | (2006.01) |
| H04L 12/851 | (2013.01) |
| H04L 12/865 | (2013.01) |
| H04L 12/863 | (2013.01) |
| H04L 12/801 | (2013.01) |

(52) U.S. Cl.
CPC ........ H04L 47/2441 (2013.01); H04L 43/106 (2013.01); H04L 47/14 (2013.01); H04L 47/6275 (2013.01); H04L 47/6295 (2013.01)

(58) Field of Classification Search
CPC combination set(s) only.
See application file for complete search history.

(56) References Cited

U.S. PATENT DOCUMENTS

| | | | |
|---|---|---|---|
| 6,570,885 B1 * | 5/2003 | Gregg ................. | G06F 12/0813 370/379 |
| 8,457,846 B2 | 6/2013 | Fischer et al. | |
| 9,083,581 B1 * | 7/2015 | Addepalli ............ | H04W 4/046 |
| 2011/0161484 A1 * | 6/2011 | Van den Bogaert ......................... | H04L 43/0876 709/224 |
| 2013/0070584 A1 * | 3/2013 | Hutchison ........... | G06F 11/3058 370/216 |
| 2013/0262648 A1 * | 10/2013 | Orlik ...................... | H04L 47/32 709/223 |
| 2015/0023160 A1 * | 1/2015 | Alisawi ................... | H04L 47/32 370/230 |
| 2015/0282086 A1 * | 10/2015 | Gupta ............... | H04W 52/0229 455/574 |
| 2015/0312599 A1 | 10/2015 | Brockmann et al. | |
| 2017/0093740 A1 * | 3/2017 | Park .................... | H04L 47/6255 |
| 2017/0163543 A1 * | 6/2017 | Wang ................... | H04L 47/215 |

* cited by examiner

*Primary Examiner* — Hashim S Bhatti
(74) *Attorney, Agent, or Firm* — Jennifer M. Stec; Brooks Kushman P.C.

(57) ABSTRACT

A memory of a mobile device stores a router service, and a plurality of queues. Each queue includes packets from a respective mobile application to be sent over the transport connection. A processor is programmed to execute instructions of the router service to manage a serial transport connection between the mobile device and a vehicle computing system to route the packets over the connection according to packet wait time, size, and priority.

17 Claims, 3 Drawing Sheets

MOBILE DEVICE TO VEHICLE OUTPUT STREAM PACKET PRIORITIZATION

TECHNICAL FIELD

Aspects of the disclosure generally relate to packet prioritization for a single output stream of communication between a vehicle and a connected mobile device.

BACKGROUND

BLUETOOTH technology may be utilized to create a virtual serial port to send messages between BLUETOOTH devices. The virtual serial port may be a communication channel established between the BLUETOOTH devices using a Serial Port Profile (SPP) radio frequency communication (RFCOMM) channel. The SPP may be specified by using a SPP universal unique identifier (UUID) predefined by the BLUETOOTH standard as 0x1101, or in its long form, as 00001101-0000-1000-8000-00805F9B34FB.

In many devices, a maximum number of supported RFCOMM/SPP channels may be limited to a small number, such as six. Thus, systems that desire the use of many RFCOMM/SPP virtual serial channels may encounter errors relating to one or more devices exceeding the maximum number of available RFCOMM/SPP virtual serial channels.

Multiplexing is a technique whereby multiple message sources or destinations may utilize a single RFCOMM/SPP BLUETOOTH channel. Multiplexing may be done to avoid errors relating to one or more devices exceeding the maximum number of available RFCOMM/SPP virtual serial channels.

SUMMARY

In one or more illustrative embodiments, a system includes a memory of a mobile device storing a router service and a plurality of queues, the queues including packets from respective mobile applications to be sent over a serial transport connection between the mobile device and a vehicle computing system; and a processor, programmed to execute instructions of the router service to manage a serial transport connection between the mobile device and a vehicle computing system to route the packets over the connection according to packet wait time, size, and priority.

In one or more illustrative embodiments, a method includes iterating, through queues including packets from respective mobile applications to be sent over a serial transport connection between a mobile device and a vehicle computing system, to cache identification of which application has a queue with a head packet of a highest priority; indicating packets from the queue of the cached application for sending over the connection; and resetting a pause timer for an application removed as the cached application.

In one or more illustrative embodiments, a non-transitory computer-readable medium comprising instructions that, when executed by a processor, cause the processor to iterate, through queues including packets from respective mobile applications to be sent over a serial transport connection between a mobile device and a vehicle computing system, to cache identification of which application has a queue with a head packet of a highest priority; indicate packets from the queue of the cached application for sending over the connection; and reset a pause timer for an application removed as the cached application, the pause timer excluding packets from the queue of the paused application from consideration until the pause timer expires or the pause application has a head packet of higher priority than the head packet of the cached application.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
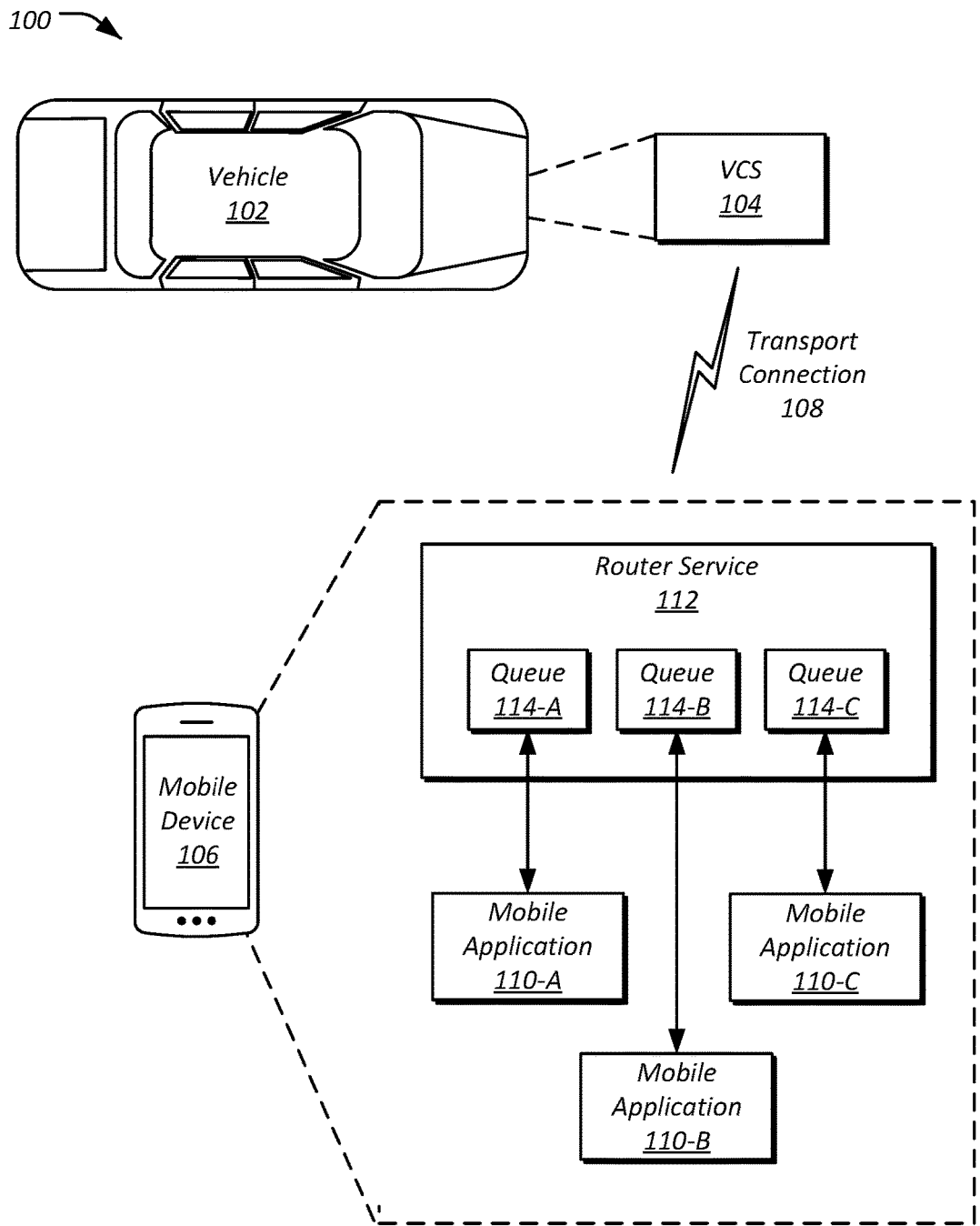
FIG. 1 illustrates an example system for multiplexing client data utilizing a router service of a mobile device.

FIG. 1 illustrates an example system 100 for multiplexing client data utilizing a router service 112 of a mobile device 106. The system 100 includes a vehicle 102 having a vehicle computing system (VCS) 104. The VCS 104 is configured to communicate over a transport connection 108 with the mobile device 106. The system 100 also includes a plurality of mobile applications 110 installed to the mobile device 106. Each of the mobile applications 110 communicates with the router service 112, where the router service 112 is configured to perform routing of data over the transport connection 108 to the VCS 104. While an example system 100 is shown in FIG. 1, the example components as illustrated are not intended to be limiting. Indeed, the system 100 may have more or fewer components, and additional or alternative components and/or implementations may be used.

The vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electric vehicle (PHEV), or a parallel/series hybrid electric vehicle (PSHEV).

The VCS 104 may be configured to support voice command and BLUETOOTH interfaces with the driver and driver carry-on devices, receive user input via various buttons or other controls, and provide vehicle status information to a driver or other vehicle 102 occupants. An example VCS 104 may be the SYNC system provided by FORD MOTOR COMPANY of Dearborn, Mich.

The VCS 104 may further include various types of computing apparatus in support of performance of the functions of the VCS 104 described herein. In an example, the VCS 104 may include one or more processors configured to execute computer instructions, and a storage medium on which the computer-executable instructions and/or data may be maintained. A computer-readable storage medium (also referred to as a processor-readable medium or storage) includes any non-transitory (e.g., tangible) medium that participates in providing data (e.g., instructions) that may be read by a computer (e.g., by the processor(s)). In general, a processor receives instructions and/or data, e.g., from the storage, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, JavaScript, Perl, PL/SQL, etc.

The VCS 104 may be configured to communicate with mobile devices 106 of the vehicle occupants. The mobile devices 106 may be any of various types of portable computing device, such as cellular phones, tablet computers, smart watches, laptop computers, portable music players, or other devices capable of communication with the VCS 104. As with the VCS 104, the mobile device 106 may include one or more processors configured to execute computer instructions, and a storage medium on which the computer-executable instructions and/or data may be maintained.

The transport connection 108 may be a data connection between the VCS 104 and the mobile device 106. In many examples, the VCS 104 may include a wireless transceiver (e.g., a Bluetooth® controller, a ZigBee® transceiver, a Wi-Fi transceiver, etc.) configured to communicate with a compatible wireless transceiver of the mobile device 106. Additionally or alternately, the VCS 104 may communicate with the mobile device 106 over a wired connection, such as via a USB connection between the mobile device 106 and a USB subsystem of the VCS 104.

The mobile applications 110 may be included on the storage of the mobile device 106. The mobile applications 110 may include instructions that, when executed by the processor of the mobile device 106, cause the mobile device 106 to perform various operations, such as facilitate the streaming of media content, provide navigation services, and/or facilitate scheduling of appointments or service visits via the VCS 104. As shown, the mobile applications 110 are installed to the mobile device 106 of a vehicle occupant. In such examples, the mobile device 106 may connect to the VCS 104 over the transport connection 108 via APPLINK, SmartDeviceLink, or another wired or wireless in-vehicle mobile application framework to allow the application 110 to interact with the vehicle 102.

The router service 112 may be configured to maintain the mobile device 106 side of the transport connection 108 between the VCS 104 and the mobile device 106. The router service 112 may be implemented including a code library linked to or otherwise incorporated into each of the mobile applications 110 that is enabled to communicate with the VCS 104 via the transport connection 108. Additionally or alternately, the router service 112 may be implemented using a separate application installed to the storage of the mobile device 106 and configured to communicate with the mobile applications 110 and the VCS 104.

When executed by the mobile device 106, the router service 112 may be configured to support a RFCOMM channel transport connection 108 to the VCS 104. Accordingly, the router service 112 may be configured to send a serial line of bytes that form complete packets. Responsive to an executing mobile application 110 registering with the router service 112, the router service 112 may be configured to map the mobile application 110 to its associated requested sessions.

The mobile applications 110 may send data to the VCS 104 by sending packets or bytes through interprocess communications method available in the operating system, for example binder messages, to the router service 112. The router service 112 then attempts to place the received data in a queue 114 for that mobile applications 110 and prioritizes the data. Once the data is up in the queue 114, the router service 112 writes out the bytes to the VCS 104.

When multiple clients (e.g., mobile applications 110) are connected through a single output channel (e.g., via the transport connection 108), the router service 112 of the channel may process packets of data in a serial fashion, queuing up packets to send as they are received. However, a single client could prepare a massive amount of packets and send them to the router service 112 during a relatively short amount of time. This may cause the transport connection 108 to become clogged up until all these packets are processed. In such a situation, it may be an implicit result of the router service 112 that higher priority packets, such as packets related to updating of the user interface (UI) of the VCS 104, to wait until processing of the other packets occurs. The user may not be aware that the large transfers are happening, so the user may perceive a poor user experience with the UI of the VCS 104.

By constructing a priority system to packets and clients, the router service 112 may be configured to minimize lag for higher priority packets. One aspect of the router service 112 include the introduction of a serial queue 114 for each client. Accordingly, as each mobile application 110 provides packets to the router service 112 to be processed, the router service 112 adds those packets to the serial queue 114 corresponding to the sending application 110. By using multiple serial queues 114 for each connected client, the router service 112 ensures that the packets are processed in time order for each client individually.

The router service 112 may determine the priority of the packets in the queues 114 according to various factors or variables. In an example, these variables may include how long the packet has been waiting in the queue 114. For instance, responsive to the router service 112 receiving a potential packet to send, the router service 112 may assign a timestamp to the packet according to the current time. Accordingly, the router service 112 may utilize the timestamp to identify how long a packet has been waiting to be sent.

In another example, the router service 112 may additionally or alternately take into account the size of the packet in bytes. For instance, packets having a smaller size in bytes may be given a greater priority than packets having a larger size. As one specific metric, packets transmittable as a single packet to the VCS 104 may be given a higher priority than packets requiring multiple packets to be transmitted to the VCS 104.

In yet a further example, the router service 112 may additionally or alternately utilize a priority coefficient included within, attached to, or otherwise provided with the packet to determine priority of the packet. This coefficient may be predetermined based on the type of packet being sent. For instance packets related to the UI of the VCS 104 may be given a high priority, while bulk data transfer packets may be given a low priority. In an example, the coefficient may be rated in accordance with whether the packet being sent contains all data in a single packet or if there are multiple packets required to provide the data to the VCS 104. In many examines, zero may be the highest priority, with priority decreasing as the numerical value increases, although other approaches may additionally or alternately be used.

One example equation to determine the priority of the packets may be specified as follows by Equation 1:

$$\text{Priority} = \text{TIME\_WAITING} - (\text{PACKET\_SIZE} + \text{PRIORITY\_COEF}) \quad (1)$$

Another more detailed example equation to determine the priority of the packets may be specified as follows by Equation 2:

$$((((\text{currentTime} - \text{timestamp}) + \text{DELAY\_CONSTANT}) \\ *\text{DELAY\_COEF}) - ((\text{size} - \text{SIZE\_CONSTANT}) \\ *\text{SIZE\_COEF}) - \\ (\text{priorityCoefficient} * \text{PRIORITY\_COEF\_CONSTANT})) \quad (2)$$

where DELAY_CONSTANT=500;
SIZE_CONSTANT=1000;
PRIORITY_COEF_CONSTANT=500;
DELAY_COEF=1; and
SIZE_COEF=1;

The router service 112 may determine that when a client is determined to have a packet that is not the highest priority and other factors are present, e.g., if its priority coefficient is larger than zero, the router service 112 may request for that client's queue 114 to be paused for a delay. This opens a window for future packets to be processed by the router service 112 before the router service 112 starts processing a large packet that will cause a significant delay for packets that have a high priority. Further aspects of the operation of the router service 112 are discussed with respect to FIGS. 2 and 3 below.

Figure 2:
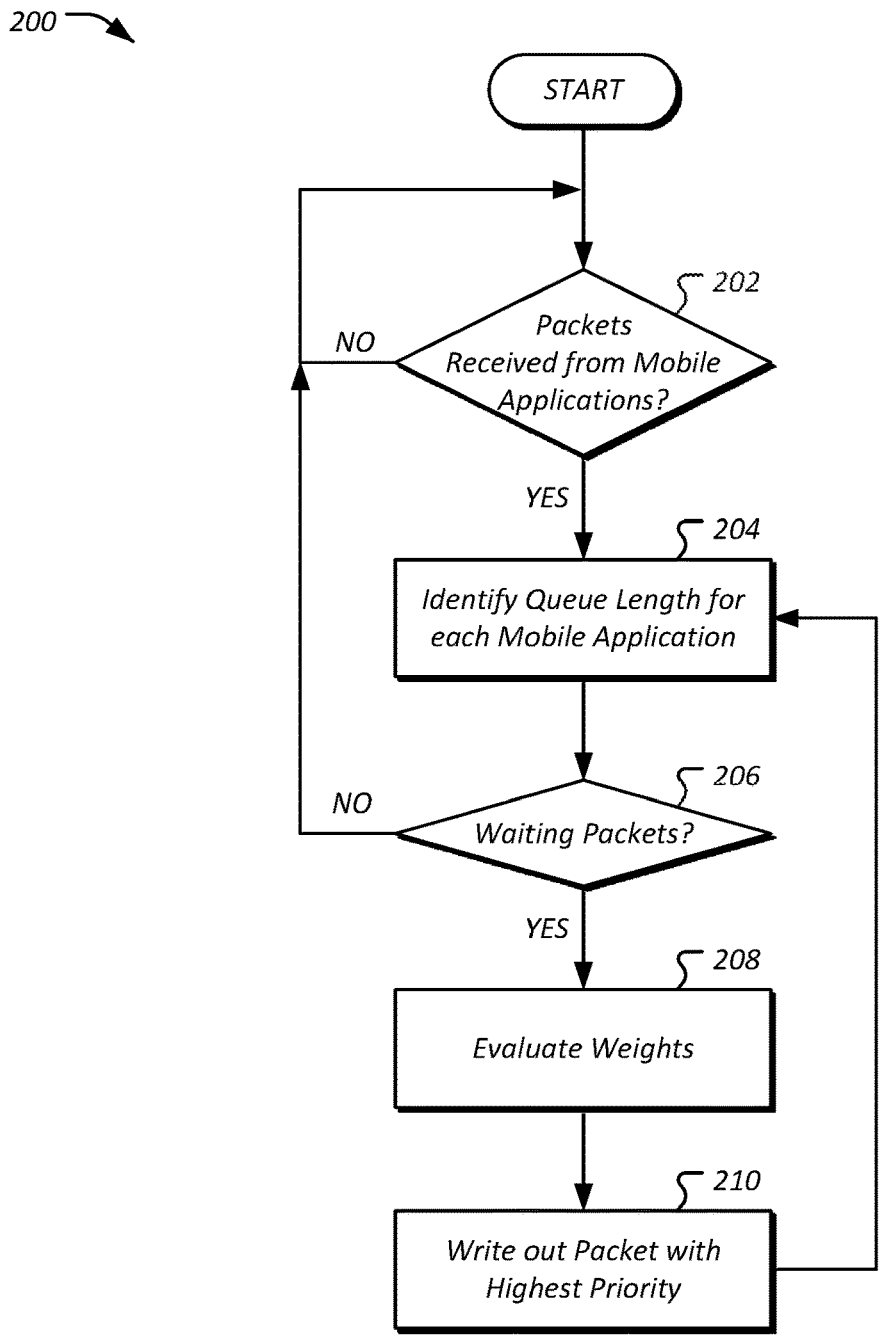
FIG. 2 illustrates an example process for processing of packets from mobile applications by the router service.

FIG. 2 illustrates an example process 200 for processing of packets from mobile applications 110. In an example, the process 200 may be performed by the router service 112 of the system 100 in communication with one or more mobile applications 110.

At 202, the router service 112 determines whether any packets have been received from the mobile applications 110. In an example, the router service 112 may receive packets from the mobile applications 110 intending to communicate over the transport connection 108 to the VCS 104. If new packets are received, control passes to operation 204. If not, control remains at operation 202.

The router service 112 at 204 identifies the length of the queues 114 for each of the mobile applications 110 utilizing the router service 112. In an example, the router service 112 determines the length of the queues 114 as a count of the pending packets waiting in the respective queue 114 for transport.

At operation 206, the router service 112 determines whether any packets are waiting. In an example, if any of the queue 114 lengths indicate that packets are present, control passes to operation 208. If no packets are waiting in any queue 114, control returns to operation 202.

At 208, the router service 112 evaluates weights of the waiting packets. In an example, the router service 112 may account for packet age in the queue 114, packet size, and priority coefficient information. Further aspects of the operations performed at 208 are discussed in detail with respect to the process 300 of FIG. 3.

At 210, the router service 112 writes out the packet with the highest priority. In an example, the router service 112 sends the identified packet serially over the transport connection 108. After operation 210, control returns to operation 204.

Figure 3:
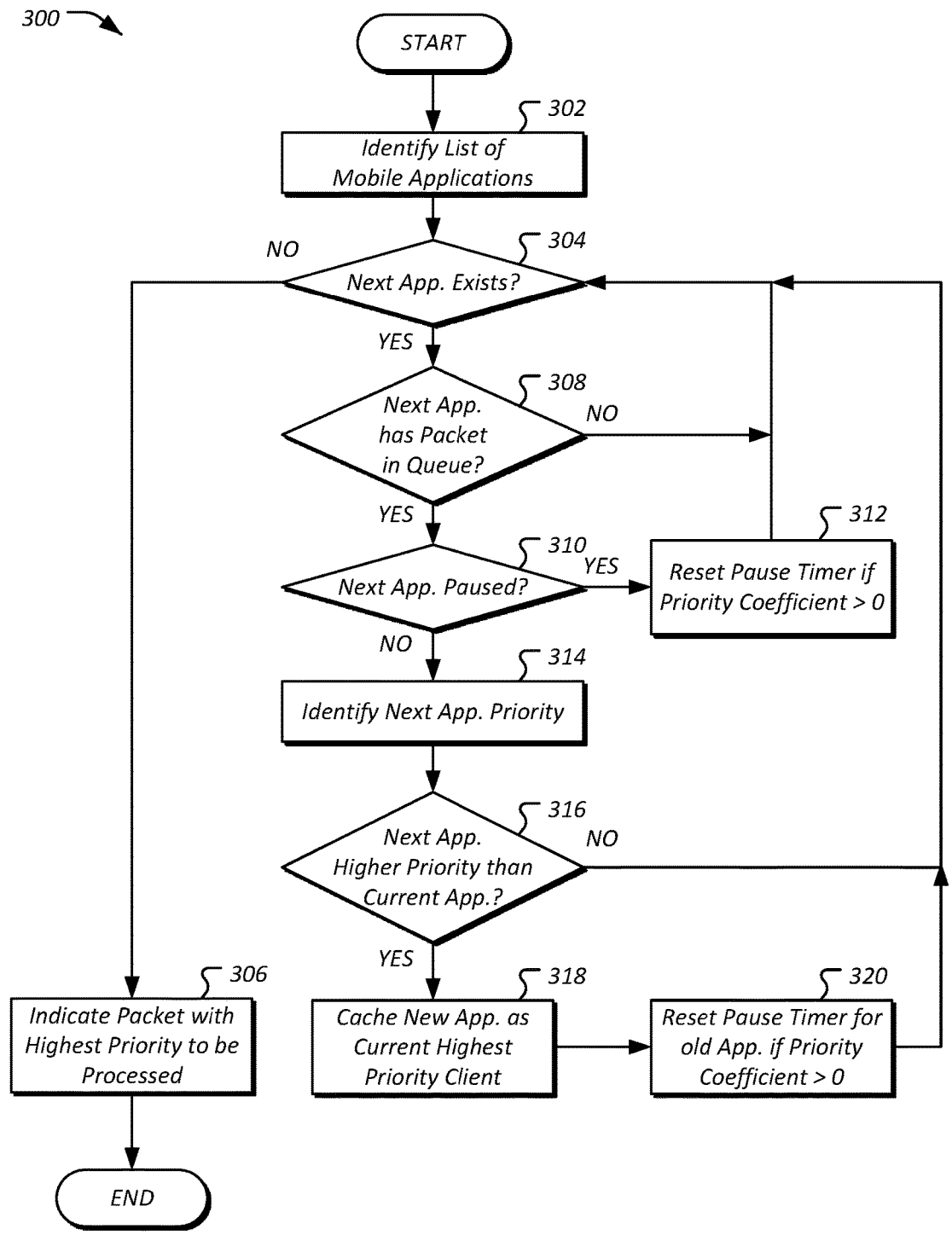
FIG. 3 illustrates an example process for evaluating packet weights of packets from mobile applications by the router service.

FIG. 3 illustrates an example process 300 for evaluating packet weights of packets from mobile applications 110 by the router service 112. The process 300 may be performed by the router service 112 of the system 100 in communication with one or more mobile applications 110.

At 302, the router service 112 identifies a list of mobile applications 110. In an example, one or more mobile applications 110 may register with the router service 112. Once registered, the router service 112 may add the mobile application 110 to a map of registered applications, and may associate the mobile application 110 to data queues 114. Thus, the registered mobile applications 110 may send data to the VCS 104. In an example, this data may be of the form of a byte array and interprocess communication methods such as binder messages or intents information addressed to the router service 112.

At operation 304, the router service 112 determines whether a next mobile application 110 exists in the map of mobile applications 110. If the current mobile application 110 is the only mobile application 110 in the map of connected mobile applications 110, control passes to operation 306. If other mobile applications 110 are in the map, then the next mobile application 110 becomes the current mobile application 110 being processed, and control passes to operation 308, e.g., to determine whether packets of a different mobile application 110 should be processed before packets of the current mobile application 110.

The router service 112 indicates the packet with the highest priority to be processed at 306. In an example, the router service 112 may indicate that the oldest packet in the queue 114 of the current mobile application 110 being processed is the next packet to be processed. After operation 306, the process 300 ends. For instance, after the operation 306, control proceeds to operation 210 of the process 200.

At operation 308, the router service 112 determines whether the queue 114 associated with the next mobile application 110 currently being evaluated includes packets. In an example, the router service 112 may access the queue 114 associated with the next mobile application 110 to determine whether packets are waiting. If so, control passes to operation 310. Otherwise, control returns to operation 304 to see if any other mobile applications 110 have packets to be reviewed.

At 310, the router service 112 determines whether the next mobile application 110 is in a paused state. In an example, the router service 112 pauses the queue 114 for the next mobile application 110 if the router service 112 determines that the packet at the head of the queue 114 does not have the highest priority. This pause may be performed by setting a pause timer that pauses the queue 114 until expiration of the timer. In an example, the pause timer may be set to a value such as 1.5 seconds. In some examples, the amount of time of the pause timer is application-specific.

The router service 112 at 312 resets the pause timer for the next mobile application 110 if the priority coefficient for the mobile application 110 is greater than zero.

At 314, the router service 112 identifies the priority of the next mobile application 110. In an example, the router service 112 may utilize the Equation 1 indicated above to determine the priority, e.g., using a combination of the amount of time the packet has been waiting in the queue 114, the size of the packet, and a priority coefficient of the packet. The coefficient may be predetermined based on the type of packet being sent. For instance packets related to the UI of the VCS 104 may be given a high priority, while bulk data transfer packets may be given a low priority. In another example, the priority coefficient may be determined in accordance with whether the packet being sent contains all data in a single packet or if there are multiple packets required to provide the data to the VCS 104.

At operation 316, the router service 112 determines whether the priority of the next mobile application 110 is greater than the priority of the current mobile application 110. In an example, the router service 112 may compare the priority of the cached current mobile application 110 to that computed for the next mobile application 110. If so, control passes to operation 318. If not control returns to operation 304.

At 318, the router service 112 caches the next mobile application 110 as the new current mobile application 110. Accordingly, the current mobile application 110 may be updated to be the application having the highest priority out of the mapped mobile applications 110 being handled by the router service 112.

At 320, the router service 112 resets the pause timer for the mobile application 110 that was formerly the current mobile application 110 if the priority coefficient of the former mobile application 110 is greater than zero. After operation 320, control returns to operation 304.

In sum, by providing multiple variables into prioritization, the router service 112 is able to provide for granular control of ordering of processing packets in the queues 114. By using the aforementioned prioritization factors, and by introducing a delay for queues 114 with non-priority packets at their head, the router service 112 may be able to increase system usability and user acceptance.

Computing devices described herein, such as the VCS 104 and mobile device 106, generally include computer-executable instructions where the instructions may be executable by one or more computing devices such as those listed above. Computer-executable instructions (e.g., such as those of the mobile applications 110 and router service 112) may be compiled or interpreted from computer programs created using a variety of programming languages and/or technologies, including, without limitation, and either alone or in combination, Java™, C, C++, C#, Visual Basic, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a memory of a mobile device storing a router service and a plurality of queues, the queues including packets from respective mobile applications to be sent over a serial transport connection between the mobile device and a vehicle computing system; and
a processor, programmed to execute instructions of the router service to route the packets over the connection according to packet wait time, size, and priority coefficient, the routing including to
iterate through the queues to identify which application has a queue with a head packet of a highest priority;
cache that application as a current client having a highest priority, and
reset a pause timer for the application removed as having been cached as the current client having the highest priority.

2. The system of claim 1, wherein the processor is further programmed to, responsive to determining that only one of the queues includes packets, route an oldest waiting packet from the one of the queues.

3. The system of claim 1, wherein the processor is further programmed to:
assign a timestamp to packets entering the plurality of queues; and
utilize the timestamp and a current time to identify wait time of the packets from the plurality of queues.

4. The system of claim 1, wherein packets related to rendering a user interface of the vehicle computing system are assigned a first priority coefficient, and bulk data transfer packets are assigned a second priority coefficient, the first priority coefficient taking precedence over the second priority coefficient.

5. The system of claim 1, wherein packets transmittable as a single packet to the vehicle computing system are assigned a higher priority coefficient than packets requiring multiple packets to be transmitted to the vehicle computing system.

6. The system of claim 1, wherein the processor is further programmed to determine a priority of the packets according to an equation as follows:

$$Priority = TIME\_WAITING - (PACKET\_SIZE + PRIORITY\_COEF).$$

7. A method comprising:
iterating, through queues including packets from respective mobile applications to be sent over a serial transport connection between a mobile device and a vehicle computing system, to cache identification of which application has a queue with a head packet of a highest priority;
indicating packets from the queue of the cached application for sending over the connection; and
resetting a pause timer for an application removed as the cached application.

8. The method of claim 7, further comprising excluding packets from the queue of the paused application from consideration for sending over the connection until the pause timer expires.

9. The method of claim 7, further comprising excluding packets from the queue of the paused application from consideration until the pute paused application has a head packet of higher priority than the head packet of the cached application.

10. The method of claim 7, further comprising, responsive to determining that only one of the queues includes packets, routing a packet from that one of the queues.

11. The method of claim 7, further comprising:
assigning a timestamp to packets entering the queues; and
utilizing the timestamp and a current time in identifying wait time of the packets from the queues.

12. The method of claim 7, further comprising assigning a first priority coefficient to packets related to rendering a user interface of the vehicle computing system, and assigning a second priority coefficient to bulk data transfer packets, wherein packets assigned to the first priority are given precedence over packets assigned to the second priority.

13. The method of claim 7, further comprising assigning a first priority to packets transmittable as a single packet to the vehicle computing system and assigning a second priority coefficient to packets requiring multiple packets to be transmitted to the vehicle computing system, wherein packets assigned to the first priority are given precedence over packets assigned to the second priority.

14. A non-transitory computer-readable medium comprising instructions that, when executed by a processor, cause the processor to:
 iterate, through queues including packets from respective mobile applications to be sent over a serial transport connection between a mobile device and a vehicle computing system, to cache identification of which application has a queue with a head packet of a highest priority;
 indicate packets from the queue of the cached application for sending over the connection; and
 reset a pause timer for an application removed as the cached application, the pause timer excluding packets from the queue of the paused application from consideration until the pause timer expires or the pause application has a head packet of higher priority than the head packet of the cached application.

15. The medium of claim 14, further comprising instructions that, when executed by a processor, cause the processor to:
 assign a timestamp to packets entering the queues; and
 utilize the timestamp and a current time in identifying wait time of the packets from the queues.

16. The medium of claim 14, further comprising instructions that, when executed by a processor, cause the processor to assign a first priority coefficient to packets related to rendering a user interface of the vehicle computing system, and assign a second priority coefficient to bulk data transfer packets, wherein packets assigned to the first priority are given precedence over packets assigned to the second priority.

17. The medium of claim 14, further comprising instructions that, when executed by a processor, cause the processor to assign a first priority to packets transmittable as a single packet to the vehicle computing system and assign a second priority coefficient to packets requiring multiple packets to be transmitted to the vehicle computing system, wherein packets assigned to the first priority are given precedence over packets assigned to the second priority.

\* \* \* \* \*